US010518776B2

(12) United States Patent
Kang

(10) Patent No.: US 10,518,776 B2
(45) Date of Patent: Dec. 31, 2019

(54) VEHICLE SYSTEM, VEHICLE CONTROLLER, AND METHOD OF CONTROLLING VEHICLE

(71) Applicants: DENSO International America, Inc., Southfield, MI (US); DENSO CORPORATION, Kariya, Aichi-pref. (JP)

(72) Inventor: Te-Ping Kang, Ann Arbor, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 232 days.

(21) Appl. No.: 15/408,517

(22) Filed: Jan. 18, 2017

(65) Prior Publication Data

US 2018/0201270 A1    Jul. 19, 2018

(51) Int. Cl.
*B60W 30/18* (2012.01)
*B60W 10/20* (2006.01)
*B60W 10/04* (2006.01)
*B60W 30/14* (2006.01)
*B62D 15/02* (2006.01)

(52) U.S. Cl.
CPC ...... *B60W 30/18163* (2013.01); *B60W 10/04* (2013.01); *B60W 10/20* (2013.01); *B60W 30/143* (2013.01); *B62D 15/025* (2013.01); *B62D 15/0255* (2013.01); *B60W 2420/42* (2013.01); *B60W 2520/06* (2013.01); *B60W 2520/10* (2013.01); *B60W 2550/14* (2013.01); *B60W 2710/20* (2013.01); *B60W 2720/10* (2013.01)

(58) Field of Classification Search
CPC .. B60W 30/18; B60W 30/16; B60W 2710/20; B60W 30/14; B60W 30/02; B60W 30/18163; B60W 10/04; B60W 10/184; B60W 30/10; B60W 10/20
See application file for complete search history.

(56) References Cited

U.S. PATENT DOCUMENTS

| 5,752,220 | A | * | 5/1998 | Geier | G01C 21/12 235/95 R |
|---|---|---|---|---|---|
| 5,765,116 | A | * | 6/1998 | Wilson-Jones | B62D 15/025 180/168 |
| 8,428,843 | B2 | * | 4/2013 | Lee | B62D 15/025 180/282 |
| 2004/0236476 | A1 | * | 11/2004 | Chowdhary | G06Q 30/0601 701/1 |

(Continued)

*Primary Examiner* — Hunter B Lonsberry
*Assistant Examiner* — Luis A Martinez Borrero

(57) ABSTRACT

A vehicle includes a plurality of wheels. A vehicle steering controller controls a heading of the vehicle by controlling at least one of the plurality of wheels. A heading sensor detects the heading of the vehicle. A processor is coupled to the vehicle steering controller and the heading sensor, and the processor is programmed to receive a lane change signal that requests a lane change. Then, the processor determines the heading of the vehicle from the heading sensor. Based on this determination, the processor instructs the vehicle steering controller to reduce the heading of the vehicle to prior to executing the requested lane change. As a result, the lane change may be executed from a similar state each time.

19 Claims, 5 Drawing Sheets

(56) References Cited

U.S. PATENT DOCUMENTS

| | | | |
|---|---|---|---|
| 2005/0256630 A1* | 11/2005 | Nishira | B60K 31/0008 701/96 |
| 2005/0278095 A1* | 12/2005 | Taliwal | G01C 21/26 701/41 |
| 2006/0009910 A1* | 1/2006 | Ewerhart | B60W 30/143 701/301 |
| 2010/0082195 A1* | 4/2010 | Lee | B62D 15/025 701/25 |
| 2011/0178689 A1* | 7/2011 | Yasui | B60T 7/12 701/70 |
| 2013/0345895 A1* | 12/2013 | Reynolds | G07C 5/008 701/1 |
| 2015/0145664 A1* | 5/2015 | You | B60W 30/12 340/438 |
| 2015/0149036 A1* | 5/2015 | You | B60W 30/12 701/41 |
| 2015/0355641 A1* | 12/2015 | Choi | G05D 1/021 701/23 |
| 2016/0107682 A1* | 4/2016 | Tan | B62D 6/00 701/41 |
| 2018/0051992 A1* | 2/2018 | Croyle | G01C 21/20 |
| 2018/0093671 A1* | 4/2018 | Allan | B60W 30/18163 |
| 2019/0100211 A1* | 4/2019 | Liu | B60W 30/18163 |

* cited by examiner

VEHICLE SYSTEM, VEHICLE CONTROLLER, AND METHOD OF CONTROLLING VEHICLE

TECHNICAL FIELD

The present disclosure relates to a vehicle system, a vehicle controller for controlling a vehicle, and a method of controlling a vehicle.

BACKGROUND

In recent times, assisted driving and automatic driving have emerged as trending technologies. As one example of such technologies, a vehicle controller may perform an assisted lane change or an automatic lane change by controlling the steering system of a vehicle. However, there is a concern that with such technologies, the assisted or automatic lane change may be performed in a manner which causes anxiety or fear in the passengers of the vehicle.

SUMMARY

According to one aspect of the present disclosure, a vehicle system for a vehicle includes a vehicle including a plurality of wheels, a vehicle steering controller, coupled to the plurality of wheels, that controls a heading of the vehicle by controlling at least one of the plurality of wheels, a heading sensor that detects the heading of the vehicle, and a processor coupled to the vehicle steering controller and the heading sensor. The processor is programmed to receive a lane change signal that requests a lane change, upon receiving the lane change signal, determine the heading of the vehicle from the heading sensor, compare an absolute value of the determined heading with a heading threshold, and if the absolute value of the determined heading of the vehicle is above the heading threshold, instruct the vehicle steering controller to reduce the absolute value of the heading of the vehicle to below the heading threshold prior to executing the requested lane change.

In another aspect of the present disclosure, a vehicle controller for controlling a vehicle includes a central processing unit, a memory coupled to the central processing unit, and a vehicle steering controller coupled to the central processing unit that controls a heading of the vehicle. The central processing unit is programmed to receive a lane change signal that requests a lane change, upon receiving the lane change signal, determine the heading of the vehicle from a heading sensor that detects the heading of the vehicle, and if the determined heading of the vehicle is has an absolute value above a heading threshold, instruct the vehicle steering controller to reduce the absolute value of the heading of the vehicle to below the heading threshold prior to executing the requested lane change.

In yet another aspect of the present disclosure, a method of controlling a vehicle includes receiving, with a processor, a lane change signal that requests a lane change, upon receiving the lane change signal, determining, with the processor, a heading of the vehicle based on the output of a heading sensor, if the determined heading of the vehicle has an absolute value above a heading threshold, instructing, with the processor, a vehicle steering controller to reduce the heading of the vehicle to below the heading threshold, and after the absolute value of the heading of the vehicle is reduced to below the heading threshold, automatically executing, with the processor, the requested lane change Still other objects, advantages, and features of the present disclosure will become apparent after considering the detailed description and drawings.

DETAILED DESCRIPTION

First Embodiment

A first embodiment of the present disclosure will be explained with reference to FIGS. 1 to 5.

Figure 1:
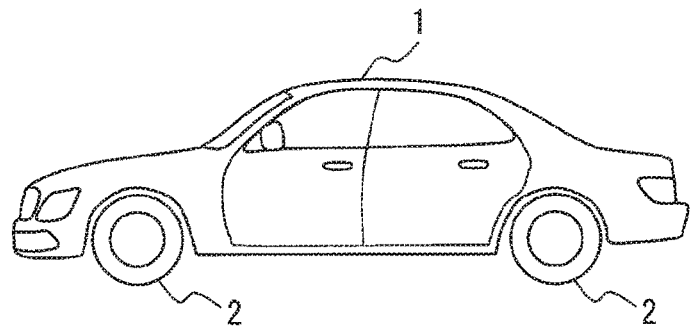
FIG. 1 is an overview of a vehicle.

FIG. 1 shows a vehicle 1 including a plurality of wheels 2. While FIG. 1 shows a sedan type passenger vehicle, this is not intended to be limiting. The present disclosure is equally applicable to all types of road vehicles, including trucks, busses, as well as specialized vehicles such as agricultural machinery.

Figure 2:
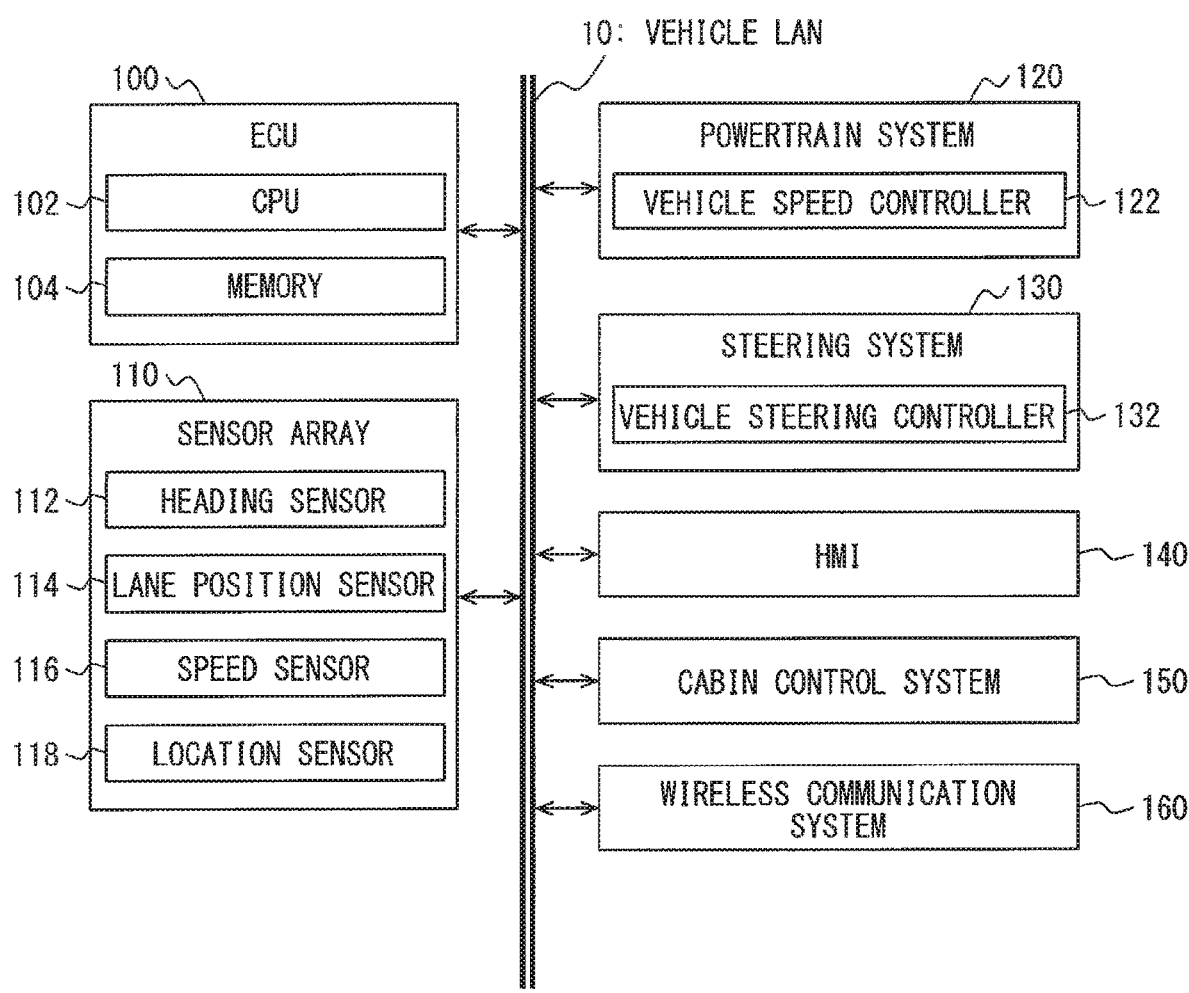
FIG. 2 is a system view of a vehicle LAN.

The vehicle 1 includes a variety of on-board systems as shown in FIG. 2. FIG. 2 is a system diagram, in which a vehicle local-area network (LAN) 10 serves as a network bus which interconnects an electronic control unit (ECU) 100, a sensor array 110, a powertrain system 120, a steering system 130, a human-machine interface (HMI) 140, a cabin control system 150, and a wireless communication system 160.

The ECU 100 is a processor which includes a central processing unit (CPU) 102 and a memory 104. The CPU 102 is preferably a microcomputer or microprocessor. The memory 104 is preferably a semiconductor memory such as random access memory (RAM), read only memory (ROM), flash memory, of a combination of these. In an alternative embodiment, the ECU 100 may be implemented as an off-board remote processor, such as through the use of a remote cloud computing server which communicates with the vehicle 1 via the wireless communication system 160. The ECU 100 serves as a vehicle controller which controls the vehicle 1. The ECU 100 and the vehicle 1 together form a vehicle system that provides lane change assistance as will be described below.

The sensor array 110 is a collection of various sensors, among which includes a heading sensor 112, a lane position sensor 114, a speed sensor 116, and a location sensor 118. Each of these sensors may be physically mounted in different locations of the vehicle 1. In addition, as shown in FIG. 2, the sensor array 110 is coupled to the ECU 100 through the vehicle LAN 10. In an alternative embodiment, the sensor array 110 may be directly connected to the ECU 100.

The powertrain system 120 controls the powertrain of the vehicle 1. For example, the powertrain system 120 may control the acceleration, deceleration, and braking of the vehicle 1. The powertrain system 120 includes a vehicle speed controller 122 which interfaces with external devices. In the present embodiment, the vehicle speed controller 122 receives command signals from the ECU 100, and controls the travel speed of the vehicle 1 in accordance with those command signals. In FIG. 2, the vehicle speed controller 122 is coupled to the ECU 100 through the vehicle LAN 10. In an alternative embodiment, the vehicle speed controller 122 may be directly connected to the ECU 100.

The steering system 130 controls the steering (i.e., the heading) of the vehicle 1 by controlling at least one of the wheels 2 of the vehicle 1. The steering system 130 includes a vehicle steering controller 132 which interfaces with external devices. In the present embodiment, the vehicle steering controller 132 receives command signals from the ECU 100, and controls the heading of the vehicle 1 in accordance with those command signals. In FIG. 2, the vehicle steering controller 132 is coupled to the ECU 100 through the vehicle LAN 10. In an alternative embodiment, the vehicle steering controller 132 may be directly connected to the ECU 100.

The HMI 140 allows a passenger to input information to the vehicle 1 through, for example, a touchscreen or a keypad, as well as receive information about the vehicle 1 through, for example, a display or a speaker. The cabin control system 150 controls various miscellaneous aspects of the vehicle 1, such as door locking and lighting. The wireless communication system 160 allows the vehicle 1 to communicate with other vehicles as well as infrastructure. The wireless communication system 160 may allow communication over a wide variety of protocols such as cellular, short range wireless, and so on.

While the system diagram of FIG. 2 shows each of the ECU 100, the sensor array 110, the powertrain system 120, the steering system 130, the HMI 140, the cabin control system 150, and the wireless communication system 160 as separate systems, this is not intended to limit the physical relationships between these systems. For example, the heading sensor 112 of the sensor array 110 may be physically mounted together with the steering system 130, while the lane position sensor 114 of the sensor array 110 may be physically mounted on the chassis of the vehicle 1. Similarly, each of the vehicle speed controller 122 and the vehicle steering controller 132 may be implemented as part of the ECU 100. In other words, while FIG. 2 shows a system layout, this does not limit the physical layout of the network. Additionally, while FIG. 2 shows the use of the vehicle LAN 10, this is merely illustrative and not intended to be limiting. Each of the system components may be directly connected to each other instead.

Figure 3:
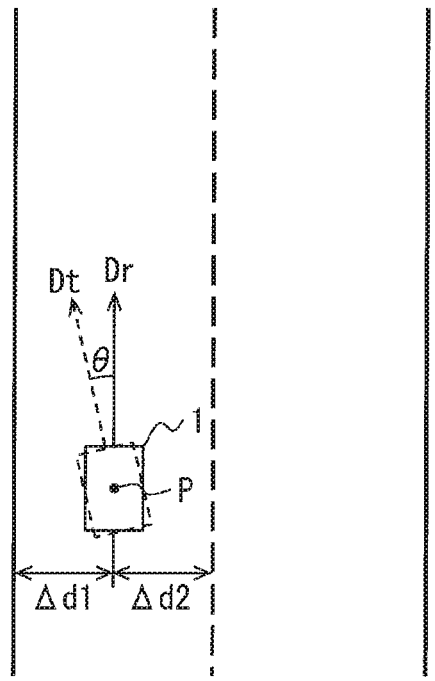
FIG. 3 is a schematic view of a travelling vehicle on a straight road.

Next, each of the sensors in the sensor array 110 will be described. The heading sensor 112 detects a heading θ of the vehicle 1 with respect to a lane along which the vehicle 1 is travelling, as shown in FIG. 3. As illustrated, the heading θ is defined as an angle between a travel direction Dt of the vehicle 1 with respect to an imaginary line Dr which is parallel with the road. It should be noted that the angles shown in the figures of the present disclosure are exaggerated for illustrative purposes. In practice, especially at expressway speeds, the heading θ of the vehicle 1 will only vary by a very small angle under normal driving conditions.

When the heading θ of the vehicle 1 is non-zero, i.e., the vehicle is not travelling straight along the road, the vehicle 1 will be laterally displaced over time with respect to the left and right edges of the lane in which the vehicle 1 is travelling. This displacement is shown as Δd1 and Δd2 in FIG. 3. In the present embodiment, the heading sensor 112 includes an optical camera which detects the edges of the lane and measures at least one of Δd1 and Δd2 over time, and the heading θ of the vehicle 1 may be calculated from Δd1 or Δd2 and the speed of the vehicle 1. In an alternative embodiment, the heading sensor 112 may be implemented as a laser sensor or an infrared sensor along with a corresponding laser or infrared camera instead. In a further alternative embodiment, the heading sensor 112 may be implemented as a steering sensor mounted on the powertrain of the vehicle 1, to directly measure the heading θ of vehicle 1 from a wheel drive shaft.

Figure 4:
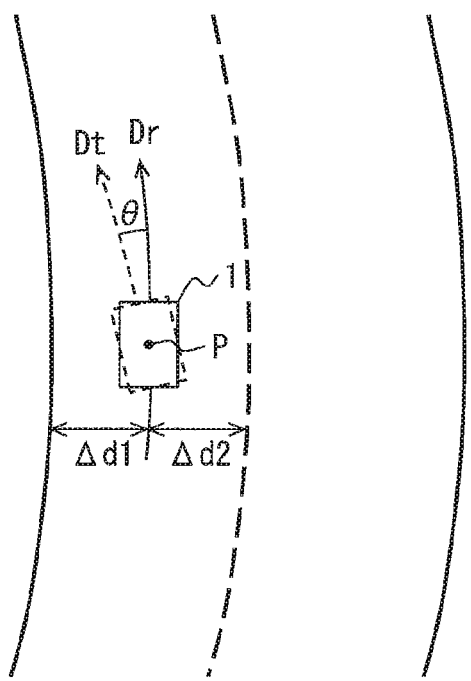
FIG. 4 is a schematic view of a travelling vehicle on a curved road.

The heading sensor 112 preferably detects the heading θ of the vehicle 1 when the vehicle 1 is travelling on a curved road as well. As shown in FIG. 4, when the road itself is curved, the travel direction Dt and the imaginary line Dr are curved as well. In this case, the displacement values Δd1 and Δd2 are still representative of the true heading θ of the vehicle 1. Specifically, although the vehicle 1 is constantly turning, if the displacement values Δd1 and Δd2 are substantially zero over time, this means the vehicle 1 is staying parallel to the road and the heading θ is substantially zero. Conversely, if the displacement values Δd1 and Δd2 are non-zero over time, this means the vehicle 1 is being laterally displaced over time from the edges of the road, and the heading θ is non-zero. In this regard, the ECU 100 may determine the heading θ of the vehicle 1 for both curved roads and straight roads. It should be noted the term "substantially" is used in this context as the vehicle 1 could never travel perfectly parallel to the road, and is only intended to include insignificant variations in heading.

The lane position sensor 114 detects a position P of the vehicle 1 within the lane, as shown in FIG. 3. In the present embodiment, the lane position sensor 114 includes an optical camera which detects the edges of the lane to extrapolate the position P. In an alternative embodiment, the lane position sensor 114 may be implemented as a laser sensor or an infrared sensor along with a corresponding laser or infrared camera instead. In these cases, the lane position sensor 114 may be integrally provided with the heading sensor 112, i.e., as the same sensor or within a common sensor package.

The speed sensor 116 detects a travel speed of the vehicle 1 (i.e., the current speed at which the vehicle 1 is travelling). The speed sensor 116 is preferably provided as the speedometer of the vehicle 1 for convenience, but may be implemented as a separate sensor.

The location sensor 118 includes a GPS receiver and a memory device that has stored thereon map information. The map information preferably includes road information such as the width of lanes, the shapes of lanes, the speed limit of roads, and so on. The location sensor 118 detects a current location of the vehicle 1 along with corresponding road information obtained from the map information which describes the current road along which the vehicle 1 is travelling.

Figure 5:
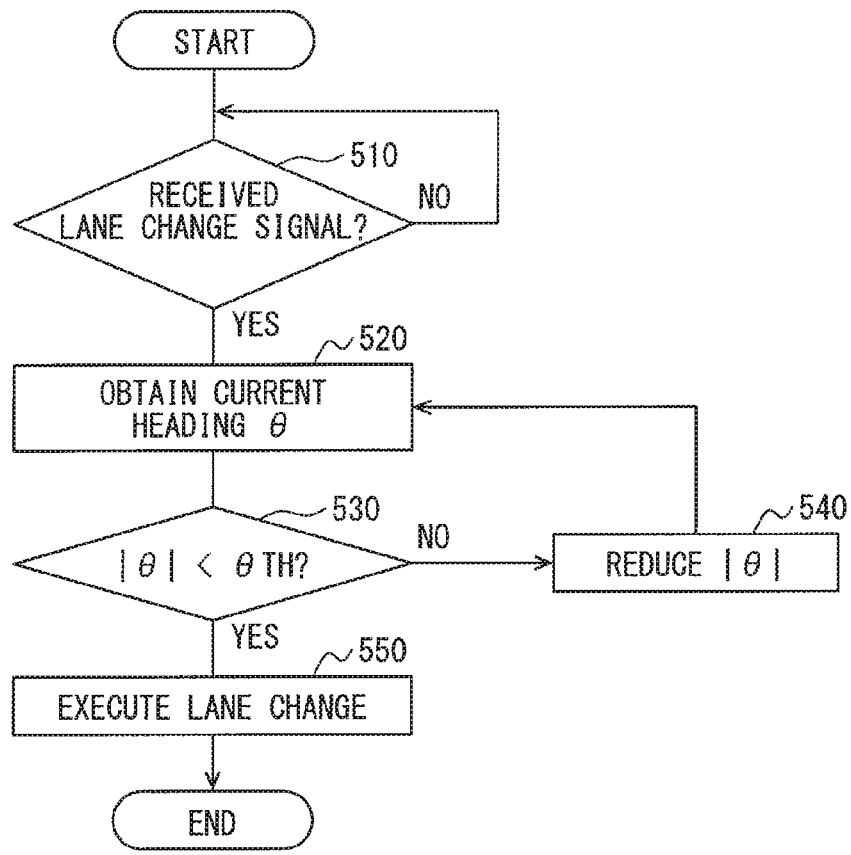
FIG. 5 is a flow chart of a lane change assist process.

The ECU 100 performs a lane change assist process as shown in FIG. 5. At step 510, the ECU 100 determines if a lane change signal is received. This lane change signal may be, for example, inputted by a passenger through the HMI 140 or through a conventional turn signal switch while the vehicle 1 is travelling in a semi-autonomous mode such as adaptive cruise control. Alternatively, this lane change signal may be generated automatically from a separate controller while the vehicle 1 is travelling in a fully autonomous mode. While the ECU 100 has not received a lane change signal ("NO" at step 510), the ECU 100 repeats step 510.

Next, when the ECU 100 receives a lane change signal ("YES" at step 510), the ECU 100 continues to step 520. At step 520, the ECU 100 obtains the current heading θ of the vehicle 1 from the heading sensor 112. It should be noted that the ECU 100 may obtain the current heading θ in a variety of formats. For example, the ECU 100 may obtain an analog voltage signal from the heading sensor 112 directly indicating the magnitude and direction of the heading θ.

Alternatively, the ECU 100 may obtain a digital signal from the heading sensor 112 encoded with the magnitude and direction of the heading θ. Further alternatively, the ECU 100 may obtain raw data indicating the displacement values Δd1 and Δd2, and calculate the heading θ based on this data. After the ECU 100 determines the current heading θ, the ECU 100 proceeds at step 530.

At step 530, the ECU 100 determines whether the absolute value of the current heading θ is below a heading threshold θTH. If the ECU 100 determines that the absolute value of the current heading θ is above the heading threshold θTH, the ECU 100 proceeds to step 540. At step 540, the ECU 100 performs a heading reduction process, the details of which will be explained later. Conversely, if the ECU 100 determines that the absolute value of the current heading θ is below the heading threshold, the ECU 100 proceeds to step 550.

At step 550, the ECU 100 executes the requested lane change (i.e., the lane change indicated by the lane change request received at step 510). It should be noted that "execute" in this context is only intended to indicate that the ECU 100 allows the requested lane change to proceed. For example, at step 550, the ECU 100 may simply instruct an external automatic lane changing controller (not illustrated) to perform the lane change. In other words, step 550 is only illustrated in FIG. 5 for completeness, and is not intended to require the ECU 100 itself to perform the requested lane change. After step 550, the ECU 100 terminates the process and, preferably, reinitiates the process at step 510.

It should be noted that throughout the present disclosure, a number of determinations are made as to whether a value is "above" or "below" a threshold. In the case that the value is exactly equal to a threshold, either an "above" or "below" determination be used instead. This scenario should rarely occur in practice and thus is omitted from consideration for the sake of brevity.

The heading threshold θTH may be a predetermined value equal to, or very close to, zero. In this case, by executing steps 510 to 550, the ECU 100 will reduce the heading θ of the vehicle 1 to zero or very close to zero. In other words, the vehicle 1 will be substantially stabilized with respect to the road prior to executing the lane change. As a result, the lane change is executed from a similar starting condition every time. In contrast, if the lane change is executed without stabilizing the heading θ of the vehicle 1, the lane change may be performed with excessive lateral acceleration, which may cause anxiety or fear in the passengers. By controlling the heading θ of the vehicle 1 prior to executing the lane change, a consistent and comfortable lane change may be performed each time.

Alternatively, the heading threshold θTH may be automatically set based on the current speed of the vehicle 1. In this case, at step 530, the ECU 100 acquires the current speed of the vehicle 1 from the speed sensor 116 to calculate the heading threshold θTH, and then compares the current heading θ to the heading threshold θTH. For example, the heading threshold θTH may be set to be lower when the current speed is high, and higher when the current speed is low. This relationship may be an inverse proportional relationship, or a predetermined look-up table may be used. The reason for this is that initiating a lane change with a larger heading θ may be acceptable at lower speeds, where there is less anxiety and fear in the passengers.

Next, the heading reduction process at step 540 will be explained in detail. In the present embodiment, each time step 540 is performed, the ECU 100 instructs the vehicle steering controller 132 to reduce the heading θ by a particular reduction amount. This reduction amount is preferably determined in advance through experimentation to ensure a smooth stabilization of the vehicle heading θ. Specifically, reducing the heading θ too quickly may result in excess lateral acceleration, which may cause anxiety or fear in the passengers. In a preferred aspect, the reduction amount is determined based on the current speed of the vehicle 1, similar to the above discussion regarding the heading threshold θTH.

Upon receiving the instruction to reduce heading from the ECU 100, the vehicle steering controller 132 controls the steering system 130 of the vehicle 1, i.e., controlling at least one of the wheels 2 to reduce the heading θ of the vehicle 1. For example, if the vehicle 1 is veering left, the vehicle steering controller 132 adjusts the wheels 2 toward the right side. If the vehicle 1 is veering right, the vehicle steering controller 132 adjusts the wheels 2 toward the left side. As shown by the control loop in FIG. 5, the heading reduction process at step 540 is repeated, if necessary, until the ECU 100 determines at step 530 that the current heading θ is below the heading threshold θTH.

In an alternative embodiment, the ECU 100 does not perform the heading reduction process itself. For example, if the vehicle 1 is equipped with a lane keeping assisted driving system, the ECU 100 may instruct this lane keeping system to reduce or zero the heading θ of the vehicle 1 at step 540. In this case, the lane keeping system would act as the vehicle steering controller 132. Further, while the above description requires the ECU 100 to repeat steps 520 to 530 after performing step 540, as an alternative embodiment, the ECU 100 may continue directly to step 550 instead of repeating steps 520 to 530.

Second Embodiment

Figure 6:
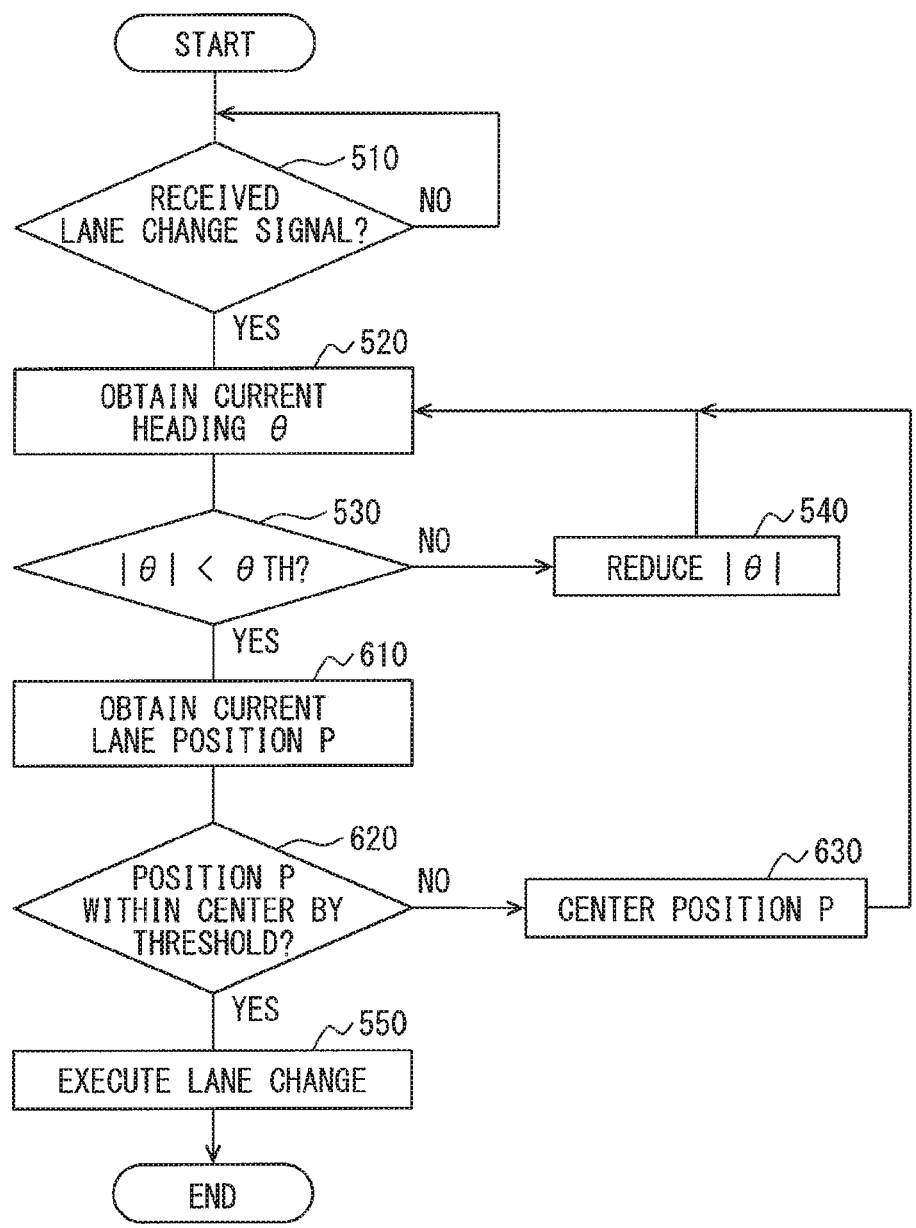
FIG. 6 is a flow chart of a lane change assist process.

A second embodiment of the present disclosure will be described with reference to FIG. 6.

In the second embodiment, the ECU 100 performs an additional lane position control sequence during the lane change assist process. As shown in FIG. 6, steps 510 to 550 are identical to those of the first embodiment. However, in the second embodiment, after the ECU 100 determines that the heading θ of the vehicle 1 is within the acceptable range, the ECU 100 continues to step 610.

At step 610, the ECU 100 reads the current lane position P of the vehicle 1 from the lane position sensor 114. Similar to step 520, the ECU 100 may receive a signal indicating the lane position in a variety of forms, such as an analog signal or a digital signal. After the ECU 100 determines the current lane position P of the vehicle 1, the ECU 100 proceeds to step 620.

At step 620, the ECU 100 determines whether the lane position P of the vehicle 1 is within the center of the lane by a distance threshold. This distance threshold may be in a variety of manners, such as a factory-set constant value, set automatically based on the speed of the vehicle 1, set automatically based on the width of the road, or set by a user according to preference. If the ECU 100 determines that the lane position P of the vehicle 1 is displaced from the center of the lane by more than the distance threshold ("NO" at step 620), the ECU 100 proceeds to step 630. Otherwise, if the ECU 100 determines "YES" at step 620, the ECU 100 continues to step 550.

At step 630, the ECU 100 performs a lane centering control process in order to center the position of the vehicle 1 in the lane. In particular, the ECU 100 instructs the vehicle steering controller 132 to steer the vehicle 1 toward the center of the lane, i.e., to position the vehicle 1 to within the predetermination distance threshold from the center of the lane. Preferably, the ECU 100 performs the lane centering control process in a smooth manner so as to ensure a comfortable experience for the passengers. For example, the ECU 100 may center the vehicle 1 over a five second period, a three second period, or a one second period. As another example, this time period may depend on the lateral distance travelled (i.e., how far the vehicle 1 is from the center of the lane), and how fast the vehicle 1 is travelling.

After step 630, the ECU 100 preferably returns to step 520, so as to repeat the heading stabilization process described in the first embodiment. This is because the heading θ of the vehicle 1 may be off-center due to the lane centering control process. As a result, in order to ensure that the heading θ of the vehicle 1 is still stabilized, the process returns to step 520. In an alternative embodiment, after step 630, the ECU 100 may return to step 610 instead to only repeat the lane centering control process. In a further alternative embodiment, after step 630, the ECU 100 may continue directly to step 550 instead.

By performing steps 610 to 630, the ECU 100 executes a lane centering control process which ensures that the vehicle 1 is centered within the lane prior to executing the requested lane change. This ensures that each lane change is executed from a similar state each time, so as to reduce anxiety and fear in the passengers.

Third Embodiment

Figure 7:
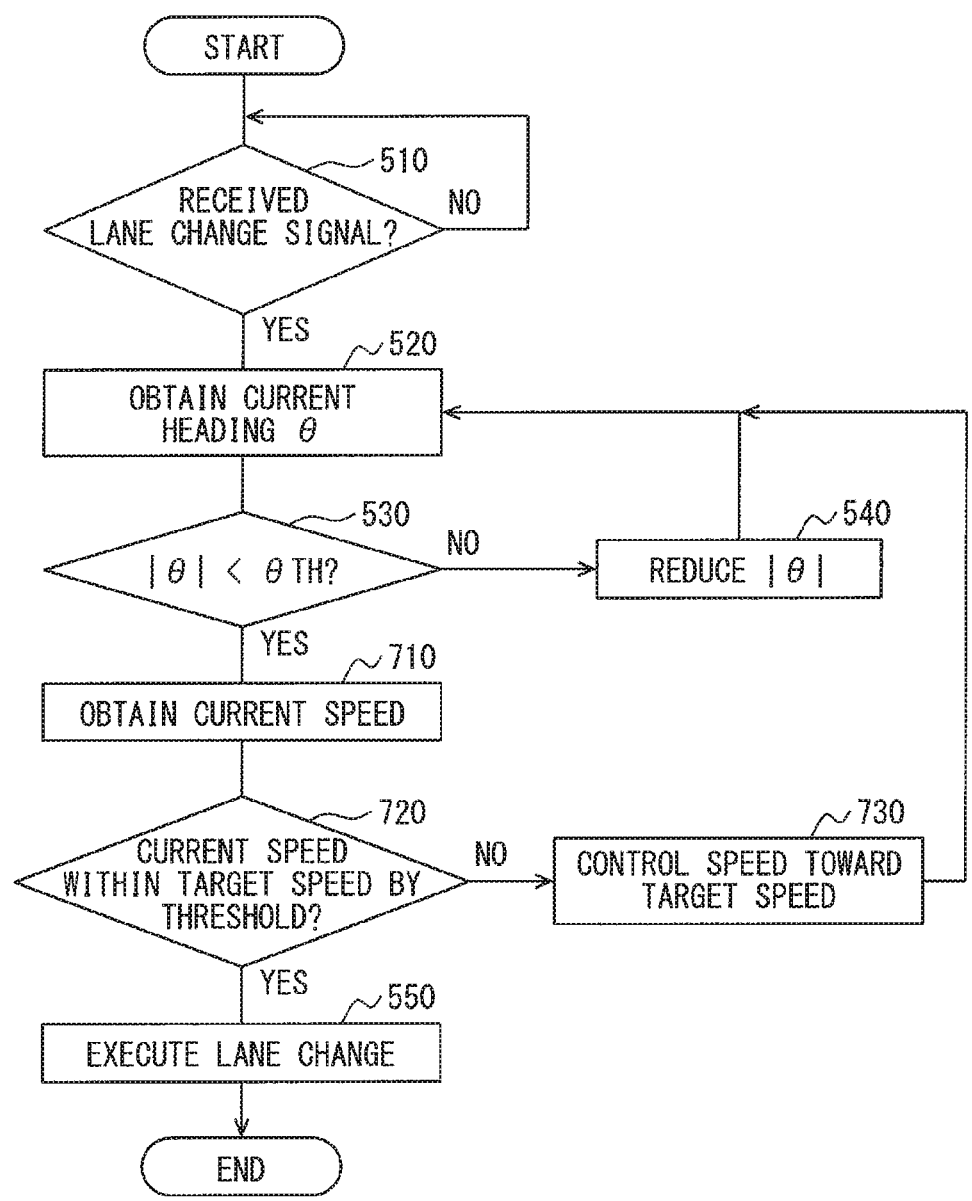
FIG. 7 is a flow chart of a lane change assist process.

A third embodiment of the present disclosure will be described with reference to FIG. 7.

In the third embodiment, the ECU 100 performs an additional speed control sequence during the lane change assist process. As shown in FIG. 7, steps 510 to 550 are identical to those of the first embodiment. However, in the third embodiment, after the ECU 100 determines that the heading θ of the vehicle 1 is within the acceptable range, the ECU 100 continues to step 710.

At step 710, the ECU 100 reads the travel speed of the vehicle 1 from the speed sensor 116. Similar to steps 520 and 610, the ECU 100 may receive a signal indicating the speed in a variety of forms, such as an analog signal or a digital signal. After the ECU 100 determines the travel speed of the vehicle 1, the ECU 100 proceeds to step 720.

At step 720, the ECU 100 determines whether the travel speed of the vehicle 1 is different from a target speed by more than a speed threshold. The speed threshold is preferably set as a percentage of the travel speed of the vehicle 1, but may be set in other manners as well, such as a factory-set constant value or a user-set value. The target speed is preferably set by detecting a travel speed of other vehicles in a destination lane of the requested lane change. In an alternate embodiment, the target speed may be set based on a speed limit of the road that the vehicle 1 is currently travelling in.

If the ECU 100 determines that the travel speed of the vehicle is different from the target speed by more than the speed threshold ("NO" at step 720), the ECU 100 proceeds to step 730. Otherwise, if the ECU 100 determines "YES" at step 720, the ECU 100 proceeds to step 550.

At step 730, the ECU 100 performs a speed correction control process in which the ECU 100 instructs the vehicle speed controller 122 to accelerate or decelerate the vehicle 1 toward the target speed to within the speed threshold. Preferably, the ECU 100 performs the speed correction control process in a smooth manner so as to ensure a comfortable experience for the passengers. For example, the ECU 100 may accelerate or decelerate the vehicle 1 over a five second period, a three second period, or a one second period. After step 730, the ECU 100 preferably returns to step 520, so as to repeat the heading stabilization process described in the first embodiment. This is to because the heading θ of the vehicle 1 may be off-center due to the speed correction control process. As a result, in order to ensure that the heading θ of the vehicle 1 is still stabilized, the process returns to step 520. In an alternative embodiment, after step 730, the ECU 100 may return to step 710 instead to only repeat the speed correction control process. In a further alternative embodiment, after step 730, the ECU 100 may continue directly to step 550 instead.

In a further embodiment, the third embodiment may be combined with the second embodiment such that both the lane centering control process and the speed correction control process are performed after the heading stabilization process. In this case, after performing the heading stabilization process, either one of the lane center control process and the speed correction control process is first performed, followed by the other.

By performing steps 710 to 730, the ECU 100 executes a speed correction control process which accelerates or decelerates the vehicle 1 to an appropriate speed prior to executing the requested lane change. By doing so, the ECU 100 ensures that the lane change itself is performed in a similar manner each time, i.e., without requiring any additional acceleration or deceleration. In this regard, each lane change may be performed in manner which reduces fear and anxiety in the passengers.

Other Embodiments

The present disclosure is described with reference to the above embodiments, but these embodiments are not intended to be limiting. A variety of modifications which do not depart from the gist of the present disclosure are contemplated.

The present disclosure includes implementation as a vehicle controller, which is a processor that includes a CPU and a memory. The vehicle controller is programmed to execute the control processes described with respect to the above described embodiments.

The present disclosure includes implementation as a method of controlling a vehicle, in which a processor performs the control processes described with respect to the above described embodiments.

The invention claimed is:

1. A vehicle system for a vehicle, comprising:
a vehicle including a plurality of wheels;
a vehicle steering controller, coupled to the plurality of wheels, that controls a heading of the vehicle by controlling at least one of the plurality of wheels;
a heading sensor that detects the heading of the vehicle; and
a processor coupled to the vehicle steering controller and the heading sensor, wherein
the processor is programmed to
receive a lane change signal that requests a lane change,
upon receiving the lane change signal, determine the heading of the vehicle from the heading sensor,
compare an absolute value of the determined heading with a heading threshold, and
if the absolute value of the determined heading of the vehicle is above the heading threshold, instruct the vehicle steering controller to reduce the absolute value of the heading of the vehicle to below the heading threshold prior to executing the requested lane change, wherein the heading is defined as an angle between a travel direction of the vehicle in a lane along which the vehicle is traveling and an imaginary line that extends along the lane, and the heading threshold is automatically determined based on a travel speed of the vehicle.

2. The vehicle system of claim 1, further comprising a lane position sensor that detects a lane position of the vehicle, the lane position defining a relative position between the vehicle and a lane in which the vehicle is travelling within, wherein upon receiving the lane change signal, the processor determines the lane position of the vehicle, and if the determined lane position of the vehicle is displaced from a center of the lane by more than a distance threshold, the processor instructs the vehicle steering controller to position the vehicle within the distance threshold from the center of the lane prior to executing the requested lane change.

3. The vehicle system of claim 2, wherein the distance threshold is automatically determined based on a travel speed of the vehicle.

4. The vehicle system of claim 1, further comprising:

a vehicle speed controller that controls a travel speed of the vehicle, the processor being coupled to the vehicle speed controller; and a speed sensor that detects a travel speed of the vehicle, wherein upon receiving the lane change signal, the processor determines the travel speed of the vehicle, and if the determined travel speed of the vehicle is different from a target speed by more than a speed threshold, the processor instructs the vehicle drive controller to accelerate or decelerate the vehicle toward the target speed to within the speed threshold prior to executing the requested lane change.

5. The vehicle system of claim 4, wherein the speed threshold is set as a percentage of the travel speed of the vehicle.

6. The vehicle system of claim 4, wherein the target speed is automatically set by detecting a travel speed of other vehicles in a destination lane of the requested lane change.

7. The vehicle system of claim 4, wherein the target speed is automatically set by detecting a speed limit of a road on which the vehicle is travelling.

8. The vehicle system of claim 1, wherein the lane along which the vehicle is traveling is a curved lane, and the requested lane change is executed in the curved lane.

9. A vehicle controller for controlling a vehicle, comprising:

a central processing unit, a memory coupled to the central processing unit, and a vehicle steering controller coupled to the central processing unit that controls a heading of the vehicle, wherein the central processing unit is programmed to receive a lane change signal that requests a lane change, upon receiving the lane change signal, determine the heading of the vehicle from a heading sensor that detects the heading of the vehicle, and if the determined heading of the vehicle is has an absolute value above a heading threshold, instruct the vehicle steering controller to reduce the absolute value of the heading of the vehicle to below the heading threshold prior to executing the requested lane change, wherein the heading is defined as an angle between a travel direction of the vehicle in a lane along which the vehicle is traveling and an imaginary line that extends along the lane, and the heading threshold is automatically determined based on a travel speed of the vehicle.

10. The vehicle controller of claim 9, wherein the central processing unit is further programmed to:

upon receiving the lane change signal, determine a lane position of the vehicle from a lane position sensor, the lane position sensor detecting the lane position of the vehicle, the lane position defining a relative position between the vehicle and a lane in which the vehicle is travelling within, and if the determined lane position of the vehicle is displaced from a center of the lane by more than a distance threshold, instruct the vehicle steering controller to position the vehicle within the distance threshold from the center of the lane prior to executing the requested lane change.

11. The vehicle controller of claim 10, wherein the distance threshold is automatically determined based on a travel speed of the vehicle.

12. The vehicle controller of claim 9, further comprising:

a vehicle speed controller that controls a travel speed of the vehicle, the central processing unit being coupled to the vehicle speed controller, and the central processing unit is further programmed to:

upon receiving the lane change signal, determine a travel speed of the vehicle from a speed sensor that detects the travel speed of the vehicle, and if the determined travel speed of the vehicle is different from a target speed by more than a speed threshold, instruct the vehicle drive controller to accelerate or decelerate the vehicle toward the target speed to within the speed threshold prior to executing the requested lane change.

13. The vehicle controller of claim 12, wherein the speed threshold is set as a percentage of the travel speed of the vehicle.

14. The vehicle controller of claim 12, wherein the target speed is automatically set by detecting a travel speed of other vehicles in a destination lane of the requested lane change.

15. The vehicle controller of claim 12, wherein the target speed is automatically set by detecting a speed limit of a road on which the vehicle is travelling.

16. The vehicle computer of claim 9, wherein the lane along which the vehicle is traveling is a curved lane, and the requested lane change is executed in the curved lane.

17. A method of controlling a vehicle, comprising:

receiving, with a processor, a lane change signal that requests a lane change;

upon receiving the lane change signal, determining, with the processor, a heading of the vehicle based on the output of a heading sensor;

if the determined heading of the vehicle has an absolute value above a heading threshold, instructing, with the processor, a vehicle steering controller to reduce the heading of the vehicle to below the heading threshold; and after the absolute value of the heading of the vehicle is reduced to below the heading threshold, automatically executing, with the processor, the requested lane change, wherein the heading is defined an angle between a travel direction of the vehicle in a lane along which the vehicle is traveling and an imaginary line that extends along the lane, and the heading threshold is automatically determined based on a travel speed of the vehicle.

18. The method of claim 17, wherein the processor is remote from the vehicle.

19. The method of claim 17, wherein the lane along which the vehicle is traveling is a curved lane, and the requested lane change is executed in the curved lane.

* * * * *